(No Model.) 2 Sheets—Sheet 1.

G. WIARD.
HORSE HAY RAKE.

No. 457,485. Patented Aug. 11, 1891.

Witnesses:
Chas. J. Buchheit
Emil J. Neuhart

Inventor:
George Wiard
By Wilhelm Bonner
Attorneys (No Model.) 2 Sheets—Sheet 2.
G. WIARD.
HORSE HAY RAKE.
No. 457,485. Patented Aug. 11, 1891.
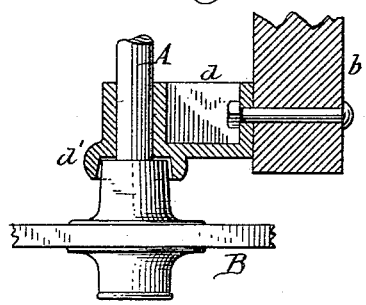
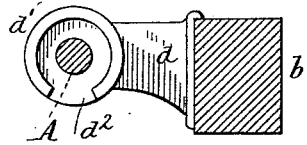
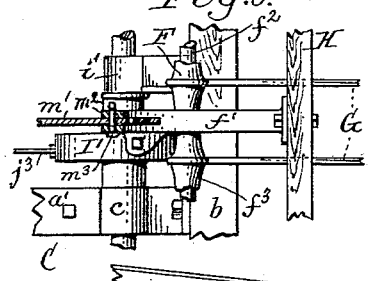

UNITED STATES PATENT OFFICE.

GEORGE WIARD, OF BATAVIA, NEW YORK, ASSIGNOR TO THE WIARD PLOW COMPANY, OF SAME PLACE.

HORSE HAY-RAKE.

SPECIFICATION forming part of Letters Patent No. 457,485, dated August 11, 1891.

Application filed March 3, 1890. Serial No. 342,406. (No model.)

*To all whom it may concern:*

Be it known that I, GEORGE WIARD, a citizen of the United States, residing at Batavia, in the county of Genesee and State of New York, have invented new and useful Improvements in Horse Hay-Rakes, of which the following is a specification.

This invention relates to horse hay-rakes in which the pivoted rake is dumped from the rotating axle by means of a pawl or other coupling device, which is brought into gear with the axle by the driver and is automatically disengaged from the axle, so as to allow the rake to descend after it has cleared the gathered pile of hay.

The leading object of my invention is to construct the dumping mechanism in such manner that the rake may be held in an elevated position by the driver after the same has been automatically thrown out of gear with the axle. This is desirable, because when the driver allows an unusually large quantity of hay to gather in front of the rake before throwing its elevating mechanism into gear with the axle the rake-teeth descend before they have cleared the pile and scatter the same.

My invention has the further object to improve the machine in other respects.

Figure 1:
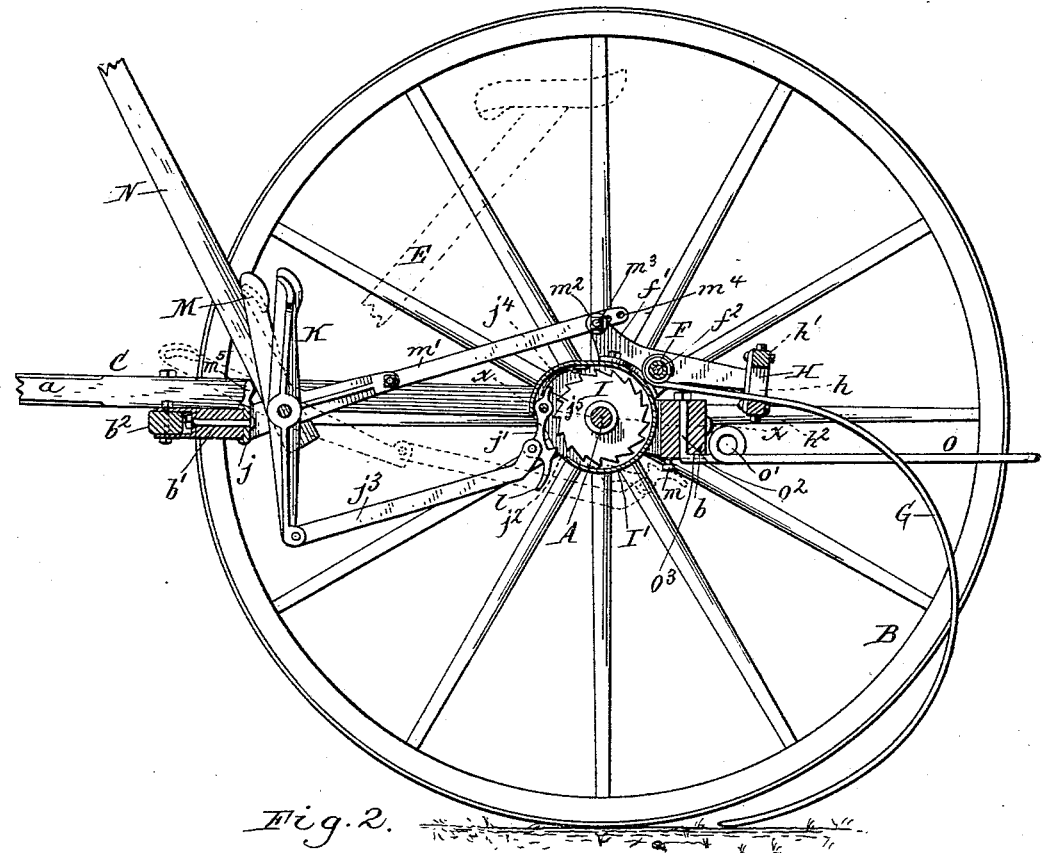
Figure 2:
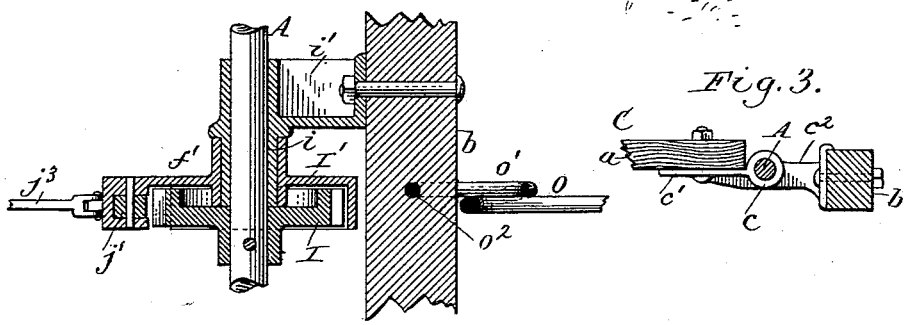
Figure 3:
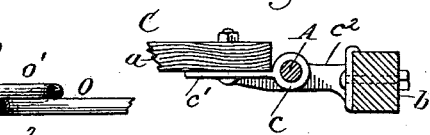

In the accompanying drawings, consisting of two sheets, Figure 1 is a longitudinal sectional elevation of a horse hay-rake provided with my improvements. Fig. 2 is a fragmentary horizontal section, on an enlarged scale, of the automatic dumping mechanism and connecting parts in line $x\ x$, Fig. 1. Fig. 3 is a cross-section showing the means whereby the draft-frame and clearer-bar are attached to the axle. Fig. 4 is a horizontal section of one of the end bearings of the driving-axle and connecting parts on an enlarged scale. Fig. 5 is an end elevation of the same. Fig. 6 is a top plan view of the machine with the seat-support shown in section. Fig. 7 is a fragmentary longitudinal sectional elevation of the seat-supporting bar and connecting parts on an enlarged scale in line $y\ y$, Fig. 6. Fig. 8 is a fragmentary rear elevation of the rider-bar. Fig. 9 is a top plan view of the automatic dumping mechanism.

Like letters of reference refer to like parts in the several figures.

A represents the axle, B the driving-wheels, and C the draft-frame, of the machine. The draft-frame consists of two side bars or thills $a$, a short intermediate longitudinal connecting-bar $a'$, a cross or clearer bar $b$, arranged in rear of the axle A, and a front cross or draft bar $b'$, to which the whiffletree $b^2$ is attached.

$c$ represents bearings in which the axle is journaled and secured to the rear ends of the side bars $a$ and intermediate connecting-bar $a'$ by vertical bolts passing through forwardly-projecting flanges $c'$, formed on the front side of the bearing $c$. These bearings are provided with rearwardly-projecting arms $c^2$, terminating in vertical faces, to which the clearer-bar $b$ is secured. This arrangement of bearings supports the central portion of the axle against deflection, and also serves to form a compact and rigid connection between the clearer-bar $b$ and the draft-frame proper, whereby the strains upon the various parts are more uniformly distributed and a comparatively light axle and draft-frame may be employed.

$d$ represents bearings secured to opposite ends of the clearer-bar $b$, and in which the outer portions of the axle A are journaled. As shown in Figs. 4 and 5, the bearings $d$ are each provided with enlargements or caps $d'$, surrounding the adjacent portions of the hubs of the driving-wheels B to exclude dirt, &c., from the parts. The caps $d'$ are provided with discharge-openings $d^2$ at their lower sides, through which dirt, &c., which may enter the caps can escape.

E represents the rearwardly-inclined seat-support arranged in front of the axle A near one side of the longitudinal bar $a'$. This support is attached at its lower end by a diagonal bolt $e$ to the front cross-bar $b'$ and passes upwardly through an elongated opening formed in a forwardly-projecting stirrup or frame $e'$. The latter is secured to a cross-bar $e^2$, secured in rear of the cross-bar $b'$ upon the intermediate connecting-bar $a'$ and the adjacent side bar $a$ of the draft-frame.

$e^3$ represents a spiral spring or cushion interposed between the seat-support E and an upwardly-projecting lug $e^4$, formed on the rear end of the stirrup $e'$. The spring $e^3$ is held against displacement by a forwardly-projecting stud $e^5$ of the lug $e^4$. The opening in the lower portion of the seat-support E, through which the bolt $e$ passes, is made flaring, so as to avoid springing or bending of the bolt $e$ when the support E is deflected, the opening in the stirrup $e'$ being sufficiently large to permit of the required movement of the seat-support therein.

F represents the rake-head, arranged above and slightly in rear of the axle A and pivoted to the latter by arms $f$, arranged near opposite ends of the axle, and an intermediate arm $f'$. The rake-head F consists of a transverse rod $f^2$, supported in the arms $f f'$, and a series of spacing-sleeves $f^3$.

G represents the rake-teeth, pivotally attached with their upper ends to the sleeves $f^3$, so as to be free to turn on the rod $f^2$.

H represents the rider-bar, secured to the arms $f f'$ in rear of the rake-head and provided with upright slots $h$, through which the rake-teeth G pass. As shown in Fig. 8, the rider-bar is composed of two longitudinal pieces or sections $h' h^2$, arranged one above the other and secured together by bolts or screws $h^3$. The slots $h$ are formed in the upper and wider section $h'$ and extend to the lower edge thereof, where they are closed by the lower section $h^2$. By constructing the rider-bar in this manner the lower portion of the rider-bar, which receives the strain in raising the rake-teeth, is rendered very strong and not so liable to become broken as when the bar is composed of a single piece in which the grain of the wood is not uniform or straight. The operation of slotting the bar is also greatly expedited, as a large number or all of the slots may be cut in the bar by a suitable cutting or sawing machine at the same time and without the use of boring-tools, whereby the cost of production is greatly reduced.

I represents a ratchet-wheel secured to the axle A about midway of its length, and I' represents a housing or casing formed on or secured to the intermediate arm $f'$ and inclosing the ratchet-wheel. The casing I' is mounted on a sleeve $i$, formed on a bearing $i'$, secured to the clearer-bar $b$ adjacent to the casing I', as shown in Fig. 2. The intermediate arm $f'$ is formed on or secured to the casing I', and its rear end is attached to the rider-bar.

K represents a vertical foot-lever pivoted between its ends in a yoke or bearing $j$, secured to the rear side of the front cross-bar $b'$ of the draft-frame.

$j'$ represents a depending pawl pivoted to the inner side of the casing I' and adapted to engage with the ratchet-wheel I. The pawl $j'$ projects through an opening $j^2$, formed in the lower front side of the casing I', and is connected with the lower arm of the foot-lever K by a rod $j^3$. The upper end of the foot-lever K is held in its rearward position and the pawl $j'$ in its forward or disengaged position by a spring $j^4$, secured to the inner side of the casing I' and bearing against an upwardly-projecting nose $j^5$ on the upper end of the pawl $j'$.

$l$ represents a curved or inclined nose or cam formed on the lower end of the pawl $j'$ and adapted to strike against a stop $m$, secured to the lower side of the clearer-bar $b$ and disengage the pawl from the ratchet-wheel when the pawl reaches the position shown in dotted lines in Fig. 1.

M represents a hold-down or foot lever pivoted adjacent to the vertical foot-lever K in the yoke $j$, and whereby the rake-teeth are held in a depressed or working position. The lower arm of the elbow foot-lever is connected by a rod $m'$ to an upwardly-projecting arm $m^2$, formed on the front portion of the intermediate arm $f'$ above the casing I'. When the teeth are depressed, the pivot of the elbow foot-lever and the points of connection of the rod $m'$ and arm $m^2$ are nearly in line or on the dead-center, as represented in Fig. 1, whereby only sufficient pressure need be applied to the lever in holding the rake down to overcome the vibrations caused by riding over uneven surfaces. The position of the rake-head and rider-bar can be adjusted, as may be necessary, by simply shifting the bolt $m^3$, connecting the rod $m'$ and the arm $m^2$ from one of a series of openings $m^4$, formed in the rear portion of the connecting-bar to another.

N represents a hand-lever pivoted to the bearing $j$ adjacent to the hold-down lever M and adapted to engage against a lateral projection or foot-rest $n$ on the upper end of the hold-down lever, so that upon moving the hand-lever backwardly the foot-lever is caused to take part in the movement, whereby the rake can be raised or lowered by hand. The forward movement of the hand-lever is limited by a stop $m^5$ on the upper end of the bearing $j$, and the hand-lever in turn serves to limit the forward movement of the elbow foot-lever M by the lateral foot-rest $n$ striking against the hand-lever, whereby the lower arm of the foot-lever is prevented from being elevated above the dead-center.

O represents the horizontal clearer-sticks secured to the clearer-bar $b$ and projecting rearwardly through the spaces between the rake-teeth G. These clearer-sticks consist each of a single steel rod provided near its front end with one or more coils $O'$ and in front of said coils with a shank $O^2$, passing upwardly through an opening in the clearer-bar. The upper projecting ends of the shanks are threaded and provided with screw-nuts, whereby the clearer-sticks are secured to the clearer-bar. That portion of the clearer-stick which bears against the lower side of the clearer-bar is embedded in a transverse groove $O^3$ in the lower side of the clearer-bar, whereby the clearer-sticks are held against lateral movement. By providing the clearer-sticks with coils in this manner they can be deflected by the load to a considerable extent without danger of being broken, and assist by the reaction of their coils in removing the load from the rake-teeth when dumping the load.

The operation of my improved rake is as follows: When the parts are in the working position with the teeth depressed, as shown in Fig. 1, and it is desired to dump the load, the driver releases the hold-down lever M and moves the upper end of the vertical foot-lever K forward, so as to cause the pawl $j'$ to engage with the ratchet-wheel I. This causes the casing I' to revolve with the ratchet-wheel and elevate the rake-head F, rider-bar H, and rake-teeth, whereby the load is dumped. This elevating movement continues until the cam or nose $l$ of the pawl $j'$ engages against the releasing-stop $m$, whereby the pawl is thrown out of engagement with the ratchet-wheel. The rake-head, teeth, and rider-bar, and the parts connected therewith now return to their operative position by gravity. It will be observed that the pawl $j'$ forms a link or connection between the casing I' and the push-rod $J^3$ of the foot-lever K, so that by keeping the foot-lever in a depressed position after the pawl has been released from the ratchet-wheel by the stop $m$, as indicated by dotted lines in Fig. 1, the casing I' is prevented from swinging to its normal position, thereby holding the rake-teeth in their elevated position, while allowing the ratchet-wheel and axle to rotate without affecting the pawl and the rake-head, with which latter the pawl is indirectly connected by the casing I'. Should the driver allow the rake to gather an excessive quantity of hay, he can by this provision hold the rake in an elevated position after the same has been released from connection with the axle, thereby keeping the rake-teeth clear of the pile and preventing scattering thereof, which would result in such case if the descent of the rake were controlled by the atomatic releasing mechanism alone. The pressure required to hold the rake-teeth in position is very light, as the foot-lever and connecting-rod approach or assume nearly a straight line, as represented by dotted lines in Fig. 1.

I claim as my invention—

1. The combination, with the draft-frame and the axle provided with a ratchet-wheel, of the swinging rake-head, a pawl connected with the rake-head and located on the front side of the ratchet-wheel, a lever mounted on the draft-frame in front of the pawl, a push-rod connecting said lever with said pawl, and a stop which disengages the pawl from the ratchet-wheel, whereby the pawl is thrown in engagement with the ratchet-wheel by pushing the rod backwardly when the rake-head is in its lowered position and the pawl is held out of engagement with said ratchet-wheel by a similar backward pressure on the push-rod when the pawl has been carried underneath the ratchet-wheel by the rotation of the latter, thereby holding the rake-head up after dumping, substantially as set forth.

2. The combination, with the driving-axle provided with a ratchet-wheel and the draft-frame provided with a cross-bar in rear of said axle, of an intermediate axle-bearing secured to said cross-bar, a lateral hub formed on said bearing, a rake-head and teeth, a rake-head support mounted on the hub of said axle-bearing and provided with a pawl adapted to engage with said ratchet-wheel, a foot-lever mounted on the draft-frame, and a rod connecting said lever with said pawl, substantially as set forth.

3. The combination, with the draft-frame, of a seat-support movably attached to said draft-frame, a stirrup secured to the draft-frame and in which said seat-support is guided, a lug formed on the rear end of the stirrup and provided with a forwardly-projecting stud, and a spring interposed between the seat-support and the forwardly-projecting stud on the stirrup, substantially as set forth.

4. The combination, with the draft-frame, of a seat-support provided near its lower end with a flaring opening, a diagonal fastening-bolt passing through this opening and through the draft-frame, a stirrup secured to the draft-frame, in which the upper portion of the seat-support plays, and a spring interposed between the seat-support and a lug on said stirrup, substantially as set forth.

Witness my hand this 18th day of February, 1890.

GEO. WIARD.

Witnesses:
JNO. J. BONNER,
FRED. C. GEYER.